United States Patent

[11] 3,602,437

| [72] | Inventors | Richard E. Driscoll<br>Monroe;<br>Charles H. McCallum, Swartz, both of, La. |
|---|---|---|
| [21] | Appl. No. | 15,851 |
| [22] | Filed | Mar. 2, 1970 |
| [45] | Patented | Aug. 31, 1971 |
| [73] | Assignee | Cities Service Company<br>New York, N.Y. |

[54] ATTRITIONING OF CARBON BLACK
8 Claims, No Drawings

[52] U.S. Cl. .................................................. 241/21
[51] Int. Cl. .................................................. B02c 15/00
[50] Field of Search ........................................... 241/5, 15, 21, 38, 62, 16

[56] References Cited
UNITED STATES PATENTS

| 2,453,557 | 11/1948 | Voot .......................... | 241/21 X |
| 3,565,659 | 2/1971 | Dickerson .................. | 241/5 X |

*Primary Examiner* — Granville Y. Custer, Jr.
*Attorney* — J. Richard Geaman

ABSTRACT: Carbon black structure is reduced by grinding the black in a ball mill. The grinding rate is increased and the grinding energy requirement is reduced by moistening the black with water to provide a dense, moist powdery mass of black that is subjected to the attritioning action of the ball mill. The proportion of water to carbon black is generally within the range of about 20 to about 100 parts by weight of water per 100 parts by weight of black.

ATTRITIONING OF CARBON BLACK

BACKGROUND OF THE INVENTION

Carbon blacks are characterized by a physical property known as structure, which can be generally described as a linking together of the basic particles into a chain during formation of the black. High-structure blacks are characterized by the presence of long, extensively developed chains while low-structure blacks exhibit little or no linking together of the particles. Both high- and low-structure carbon blacks are useful, each type being suitable for different applications. High and intermediate structure blacks are made primarily by oil furnace processes while low-structure blacks are produced by the thermal decomposition of natural gas in channel or thermal black processes. In rubber, carbon black structure has a significant effect upon the resultant modules of the compound, i.e. modulus development will be relatively high or low in direct proportion to the structure level of the black. In most instances structure is measured by the liquid-absorptive capacity of the black, e.g. linseed oil or dibutylphthalate absorption, since structure development can be directly related to this measurement.

It has recently been discovered that carbon blacks having desirable physical and chemical properties can be produced by the severe attritioning of carbon blacks which have either high or intermediate structure. Accordingly, the carbon black structure chains can be broken up to a considerable degree, and the chemical activity of the black can also be enhanced since the number of active sites on the surface of the particles is increased by fracture of the chains. By heavy attritioning of intermediate or high-structure oil furnace black, modified carbon blacks can be produced which resemble channel blacks, and which are therefore useful as channel black substitutes in certain rubber compounds. Because of the high surface activity of these blacks, they sometimes impart performance to rubber which is superior to or unavailable from channel blacks.

It is known that the structure of carbon black can be reduced by passing the black through tightly compressed steel rolls, or by means of rotary or vibrating ball mills wherein the black is attrited by the impact which occurs from collision between rapidly moving steel balls. Although ball milling presently represents the best known approach to the mechanical reduction of carbon black structure, this method has nonetheless suffered from the drawback of insufficient grinding rate to the extent that it is largely uneconomical, i.e. the time and energy requirements for grinding the black to the desired level of reduced structure have been too great.

SUMMARY OF THE INVENTION

It is therefore an object of this invention to increase the rate at which carbon black can be ground in a ball mill.

Another object of this invention is to reduce the amount of energy required for grinding carbon black in a ball mill.

Even another object of this invention is to produce a carbon black having reduced structure by the ball milling of a structured carbon black.

Other objects and advantages of this invention will become apparent from the following description and the appended claims.

Heretofore, carbon black has been ground in a ball mill in either a substantially dry or a substantially wet state; i.e. while having a moisture content of less than about 20 percent by weight or considerably in excess of about 100 percent by weight. In the case of dry grinding, the bulk density of the carbon black being ground is not substantially increased and the black particles are subject to being thrown about as a very loose dust within the grinding chamber. As such, it is difficult to entrap and crush the dispersed carbon black particles between the grinding media, and the grinding efficiency of the mill is thus quite low. If, on the other hand, large quantities of water are mixed with the black to the extent that a resilient paste or viscous slurry is formed, movement of the grinding media is considerably dampened and too much of the grinding energy is dissipated into the water rather into the carbon black. In addition, it becomes necessary to remove excessively large amounts of water from a paste or slurry of carbon black when it is desirable that the finished product be in a substantially dry from.

In accordance with the present invention, the carbon black being ground is moistened with water to the extent that the particles are formed into a dense, powdery mass which can be further described as substantially nondusting but which on the other hand is not so wet as to form a paste or slurry of the black. Accordingly, the grinding efficiency of the ball milling operation is greatly increased since the moistened particles can be acted upon to maximum advantage by the attritive forces of the grinding media, e.g. the rate of grinding can be increased several fold and the amount of energy required to grind each pound of black can be greatly reduced at the same time.

Generally, the proportion of water to carbon black which can be used for carrying out the invention will fall within the range of about 20 to about 100 parts by weight of water per 100 parts by weight of carbon black, but other proportions can be employed provided that dusting in the ball mill is significantly reduced without forming a paste or slurry of the carbon black. To advantage, the proportion of water to carbon black can be within the range of about 20 to about 80 parts of water per 100 parts of carbon black, but the exact proportion which should be employed depends upon such factors as the type, size and speed of the ball mill being used, the temperature of the grinding operation and the type of carbon black being ground. In any given case, the optimum proportion of water to black can be determined by means of a few simple experiments.

Upon removal from the ball mill, the moisture content of the ground carbon black depends not only upon the proportion of water to black employed during grinding, but also upon the time and temperature of the grinding operation. The carbon black may, therefore, be completely or at least partially dried within the ball mill or subjected to a subsequent drying step for further evaporation of moisture. Where desirable the moist, ground carbon black can be mixed with more water and wet pelletized and dried according to conventional techniques. In other cases the moist, ground carbon black can be mixed with water in proportions so as to form a slurry such as may be employed, for instance, in a process of black masterbatching carbon black with rubber.

Where a substantially dry carbon black product is desired, the moisture content of the ground black should be reduced to not in excess of about 10 percent by weight and more advantageously to not in excess of about 5 percent by weight. As previously indicated, the moisture content can be substantially reduced by the application of heat to the ball mill itself, and in this regard it should be pointed out that considerable amounts of grinding energy are liberated as heat into the material being ground, especially when a vibratory ball mill is employed, so that the moisture content of the ground black is reduced by means of the heat that is produced by the vigorous agitation of the grinding media and the material being ground. When preferred, extraneous heat may be supplied to the mill, or the ground material can be dried after removal from the mill.

The type of ball mill that is employed for grinding of the black is not essential to the invention since the grinding rate and/or energy requirements can be reduced with any given type. It will be understood that the term "ball mill" as used herein is intended to mean any grinding mill having an enclosed milling chamber that is partially filled with hard surfaced objects (the grinding media) such as balls, pebbles, rods, and the like, and whereupon vigorous movement of the chamber the hard surfaced objects are caused to forcefully collide with one another so that the material being ground is subjected to the attritioning effect of multitudinous, heavy impacts between the objects. It will be appreciated that vibratory ball mills can be employed to advantage in the practice of this invention since they provide a grinding rate which is generally much faster than that which is available from a rotary mill.

DESCRIPTION OF THE PREFERRED EMBODIMENTS

Example I

Carbon blacks were ground in a rotating jar mill having a mill chamber volume of 1,250 ml. The ball change consisted of 2,210 gms. of ½-inch diameter steel balls. In each case, 44 grams of carbon black was charged to the mill. The jar was rotated at 35 r.p.m. Three different carbon blacks were ground both in the dry state and with varied proportions of water added to the black. Results are shown in Table 1. The structure of the carbon blacks was determined by the Stiff Paste Oil Absorption Test, whereby lower absorption values indicate lower structure, and vice versa.

TABLE 1

HAF carbon black, stiff paste oil absorption, gal./100 lbs.

| Water to carbon ratio, by weight | Milling time, hours | | | | | |
|---|---|---|---|---|---|---|
| | 0 | 2 | 4 | 8 | 16 | 24 |
| 0/100 | 13.2 | 11.4 | 10.1 | 8.6 | 7.8 | 7.6 |
| 27/100 | 13.2 | | | 8.2 | 7.1 | 7.2 |
| 54/100 | 13.2 | | | 9.1 | 8.2 | 7.4 |
| 100/100 | 13.2 | | | 11.3 | 10.7 | 8.5 |

ISAF carbon black, stiff paste oil absorption, gal./100 lbs.

| 0/100 | 16.1 | 11.0 | 10.0 | 9.5 | 8.4 | 8.3 |
| 27/100 | 16.1 | | 9.7 | 8.4 | 8.0 | 7.4 |
| 54/100 | 16.1 | | 9.4 | 8.5 | 7.8 | 7.6 |
| 100/100 | 16.1 | | 12.8 | 11.8 | 10.2 | 9.2 |

SAF carbon black, stiff paste oil absorption, gal./100 lbs.

| 0/100 | 15.7 | | 10.0 | 9.0 | 8.5 | 8.3 |
| 27/100 | 15.7 | | 10.2 | 8.2 | 8.1 | 7.6 |
| 54/100 | 15.7 | | 9.8 | 8.8 | 8.5 | 8.4 |
| 100/100 | 15.7 | | 13.1 | 12.1 | 11.6 | 9.4 |

From Table 1 it can be seen that increased grinding efficiency resulted when the proportion of water to carbon black was within the range of about 27/100 to about 50/100. With the HAF and the SAF blacks there was an indication that the material may have been marginally overwetted at a water to carbon ratio of 54/100, and that each of the blacks was overwetted at 100/100 to the extent that grinding was less efficient than with dry carbon black. Since carbon blacks can form a paste under some conditions at water to black proportions within the range of about 50/100 to about 125/100, it appears that a paste may have formed in these experiments at the 100/100 ratio, and that this paste was sufficiently resilient to absorb much of the attritive impact of the ball change. However, this should not distract attention from the improved grinding efficiencies which were obtained with lower water to carbon ratios, and whereby the dry, dusty carbon black was formed into a dense, wetted powdery mass which could be readily acted upon by the ball change.

Example II

HAF carbon black was ground continuously in a vibrating ball mill having a horizontally disposed grinding chamber 15 inches in diameter and 18 inches long. The ball change weighed 350 lbs. and consisted of steel balls having a diameter of 1 inch. Vibration amplitude was three-quarter inch and the carbon black was fed continuously to and through the mill at the rate of 25 lbs. per hour (dry basis). The results of both dry grinding and milling in accordance with the invention are shown in Table 2. In the cases where moistened carbon black was ground, the water was sprayed onto a bed of dry carbon black powder, with gentle agitation, and the resulting densified, wetted powdery mass of black was then fed to the ball mill at a constant rate. In each case the carbon black was recirculated through the ball mill three times (3 passes).

TABLE 2

Stiff Paste Oil Absorption, Gal./100 lb.

| Water to carbon ratio, by weight | Pass I | Pass II | Pass III | Vibrating frequency of mill, v.p.m. | Input horsepower to mill |
|---|---|---|---|---|---|
| 0/100 | 11.5 | 9.7 | 9.0 | 1,140 | 20.4 |
| 0/100 | 11.4 | 10.9 | 9.8 | 900 | 10.7 |
| 10/100 | 12.0 | 10.9 | 9.8 | 900 | 10.5 |
| 20/100 | 12.2 | 11.4 | 10.4 | 900 | 10.5 |
| 30/100 | 11.8 | 11.3 | 10.8 | 900 | 10.5 |
| 40/100 | 11.5 | 10.8 | 10.0 | 900 | 10.5 |
| 50/100 | 9.8 | 9.5 | 9.5 | 900 | 10.5 |
| 60/100 | 9.0 | 8.4 | 8.4 | 900 | 10.5 |
| 70/100 | 9.4 | 9.2 | 8.8 | 900 | 10.6 |
| 80/100 | 9.4 | 9.4 | 9.4 | 900 | 10.3 |

NOTE: Initial stiff paste oil absorption of HAF black=13.2.

From Table 2 the benefit of grinding carbon black to reduce structure in accordance with the invention is clearly apparent. It can be seen that when the ratio of water to carbon black was 60/100, only one pass through the mill was required to achieve an oil absorption level of 9.0 gallons/100 lbs. whereas three passes were required to achieve this same level with dry black. In this particular case it should also be noted that the horsepower input to the mill during production of the 9.0 gal./100 lbs. oil absorption level with the 60/100 water to black ratio was only about one-half of that required with dry black. Furthermore, a lower vibration frequency was required, and this provides the advantage of prolonging the life of the ball mill.

It can also be seen from Table 2 that a water to black ratio of at least about 50/100 was required in this particular grinding operation to achieve an increasing in grinding efficiency. This is somewhat different from what is seen in the previous example, but as has already pointed out, the optimum ratio of water to carbon black is dependent upon the type of black, the type, size and speed of the mill, and the temperature of the grinding operation. Since the normal operating temperature of vibrating ball mills is substantially higher than that of rotary mills, evaporation of moisture therein naturally proceeds at a faster rate, so that a somewhat higher water to carbon black ratio would be an expected requirement. It has been determined, however, that if a ratio in excess of about 100/100 is employed, the carbon black may become too pasty for continuous feeding to and through the ball mill.

Example III

To further demonstrate the advantages of this invention with respect to grinding rate and energy requirements for reducing carbon black structure, HAF carbon black was ground both dry and in accordance with present invention by means of the same vibrating ball mill described in Example II, but while varying the rate at which the carbon black was fed to and through the mill. The carbon black was not recirculated, i.e. in each case it was subjected to only one pass through the ball mill. Results are shown in Table 3.

TABLE 3

| Water to carbon ratio | Grinding rate, lbs./hr., dry basis | Stiff paste oil absorption | Vibration frequency, v.p.m. | Horsepower input to mill |
|---|---|---|---|---|
| 0/100 | 24 | 10.7 | 1,140 | 20.1 |
| 0/100 | 60 | 11.6 | 1,140 | 20.1 |
| 60/100 | 73 | 9.6 | 1,140 | 20.1 |
| 60/100 | 170 | 10.2 | 1,140 | 20.1 |
| 60/100 | 239 | 10.4 | 1,140 | 20.1 |

As can be seen in Table 3, use of a water to carbon black ratio of 60/100 permitted grinding of the carbon black to about a 10.5 oil absorption level at 10 times the rate that was possible when grinding the black in the dry state. Concommitantly, the energy requirement for grinding each pound of black was reduced ten fold since the horsepower input to the mill remained the same even though the throughput rate was increased 10 times.

Example IV

In all of the examples described herein, the carbon blacks were dried after grinding to reduce the moisture content thereof to not in excess of about 5 percent by weight. As was previously indicated, a considerable amount of the moisture is driven off during a vibratory milling operation since much of the grinding energy is liberated as heat into the material being ground.

To demonstrate this effect, temperatures of the vibrating ball mill were determined while running without any material change therein and while running with HAF black at a grinding rate of 141.2 lbs./hr (dry basis) and using a water to black ratio of 60/100. Vibration frequency was 1140 v.p.m.; amplitude was three-quarter inch. It should be pointed out that no extraneous heat was applied to the mill, i.e. the temperatures indicated in Table 4 were the result of mechanical grinding energy being convented to heat by vibration of the ball and material charge in the mill chamber TABLE 4
Mill Temperatures, °F.

|  | Inlet (shell) | Centerline (shell) | Outlet (shell) | Interior |
|---|---|---|---|---|
| HAF, 60/100 | 140 | 145 | 140 | 170 |
| Empty | 260 | 260 | 240 | 335 |

In this case the moisture content of the carbon black as it discharged from the mill was 27.5 percent by weight. Since the water to black ratio in the feed stream was 60/100, the moisture content of the unground black was 37.5 percent, so that about 26 percent of the moisture content of the ground carbon black was removed during the grinding operation. Such an effect is, of course, beneficial to the economics of any subsequent drying step that might be employed for further reducing the moisture content of the ground black.

Example V

Using a vibratory ball mill as described in Example II, HAF carbon black was ground both in the dry state and while moist (60/100 ratio) to an oil absorption level of 10.1 gal./100 lb. The carbon black which was ground in accordance with the invention was then dried to a moisture content of less than 5 by weight. Testing of the ground blacks and an EPC channel black revealed the following properties:

|  | Dry ground | Moist ground | MPC black |
|---|---|---|---|
| Stiff paste oil absorption | 10.1 | 10.1 | 13.0 |
| Volatile, percent by weight | 2.9 | 3.4 | 5.8 |
| pH | 3.7 | 4.4 | 5.5 |
| Nitrogen surface area, m.²/gm | 86 | 101 | 112 |

Both the dry and the moist ground black were then compounded into rubber according to the following receipe:

| | Parts by weight | | |
|---|---|---|---|
|  | 1 | 2 | 3 |
| Natural rubber | 100 | 100 | 100 |
| Dry ground HAF black | 50 |  |  |
| Moist ground HAF black |  | 50 |  |
| MPC channel black |  |  | 50 |
| Pine tar | 3 | 3 | 3 |
| Stearic acid | 3 | 3 | 3 |
| Age Rite Hipar ®[1] | 1 | 1 | 1 |
| Sulfur | 2.8 | 2.8 | 2.8 |
| Captax ®[2] | 0.5 | 0.5 | 0.5 |

[1] Antioxidant, R. T. Vanderbilt Co.
[2] Accelerator, R. T. Vanderbilt Co.

After formulation, the compounds were cured at 280° F. Stress strain and other physical properties of the cured stocks are shown in Table 5.

TABLE 5

|  | 1 | 2 | 3 |
|---|---|---|---|
| 60′ L-300 modulus | 1,370 | 1,330 | 1,370 |
| 60′ tensile strength | 3,770 | 4,060 | 4,120 |
| 60′ elongation | 580 | 610 | 615 |
| Max. tensile | 4,100 | 4,130 | 4,160 |
| Aged 1 week at 176° F.: |  |  |  |
| 60′ L-300 modulus | 2,120 | 2,020 | 2,120 |
| 60′ tensile strength | 2,810 | 3,350 | 3,520 |
| 60′ elongation | 380 | 435 | 465 |
| Percent tensile retained | 75 | 83 | 85 |
| Rebound (100′ cure) | 70.7 | 71.3 | 68.7 |
| Visual dispersion | 7.0 | 7.0 | 6.8 |

It should be noted that the carbon black which was ground in accordance with the invention was characterized by a higher surface area and pH than the dry ground black and as such was more akin to the EPC black than the dry ground black. In addition, the performance imparted to the rubber compound by the moist ground black compared favorably to that imparted by the EPC black. It can also be seen that the moist ground black provided higher tensile, elongation, and better aging in the rubber compound than the dry ground black.

In the foregoing experiments, water was added to the carbon black before the latter was introduced into the ball mill. It will be understood that the water can, of course, be added to the black as it is being fed into the ball mill or even after the black has entered the grinding chamber.

While the invention has been described with reference to particular materials, conditions, apparatus, and the like, it will also be understood that various other embodiments will become apparent which are within the spirit and scope of the invention as defined in the appended claims.

We claim:

1. In a process for reducing the structure of carbon black by subjecting a structure carbon black to the attritioning action of a ball mill, the improvement which comprises attriting the carbon black in the form of a dense, powdery mass which is moistened with an amount of water which is less than that required for forming a paste of the carbon black and continuing the attritioning of the moistened black until the structure thereof has been substantially reduced.

2. The process of claim 1 wherein the proportion of water to carbon black is within the range of about 20 to about 100 parts by weight of water per 100 parts by weight of carbon black.

3. The process of claim 1 wherein the proportion of water to carbon black is within the range of about 20 to about 80 parts by weight of water per 100 parts by weight of carbon black 4 The process of claim 1 wherein the moisture content of the ground carbon black is reduced to provide a substantially dry carbon black product.

5. The process of claim 4 wherein the moisture content of said carbon black is reduced to not in excess of about 10 percent by weight.

6. The process of claim 4 wherein the moisture content of said carbon black is reduced to not in excess of about 5 percent by weight.

7. The process of claim 1 wherein the ball mill is vigorously vibrated for attritioning of the carbon black.

8. The process of claim 1 wherein the structured carbon black is an intermediate structure oil furnace black or a high structure oil furnace black.